United States Patent
Cai et al.

(10) Patent No.: US 8,923,188 B2
(45) Date of Patent: Dec. 30, 2014

(54) SYSTEM AND METHOD FOR DATA FORWARDING

(71) Applicant: FutureWei Technologies, Inc., Plano, TX (US)

(72) Inventors: Lin Cai, Schaumburg, IL (US); Bin Chen, Schaumburg, IL (US); George Calcev, Hoffman Estates, IL (US); Zhiming Li, Schaumburg, IL (US)

(73) Assignee: FutureWei Technologies, Inc., Plano, TX (US)

( * ) Notice: Subject to any disclaimer, the term of this patent is extended or adjusted under 35 U.S.C. 154(b) by 113 days.

(21) Appl. No.: 13/672,456

(22) Filed: Nov. 8, 2012

(65) Prior Publication Data
US 2013/0114506 A1  May 9, 2013

Related U.S. Application Data

(60) Provisional application No. 61/557,228, filed on Nov. 8, 2011.

(51) Int. Cl.
*H04B 7/14* (2006.01)
*H04W 4/06* (2009.01)
*H04J 3/08* (2006.01)

(52) U.S. Cl.
CPC ........................................ *H04W 4/06* (2013.01)
USPC .......................................... 370/315; 370/501

(58) Field of Classification Search
None
See application file for complete search history.

(56) References Cited

U.S. PATENT DOCUMENTS

| | | | |
|---|---|---|---|
| 2006/0050742 A1* | 3/2006 | Grandhi et al. | 370/506 |
| 2006/0153132 A1* | 7/2006 | Saito | 370/329 |
| 2007/0223438 A1* | 9/2007 | Bennett | 370/338 |
| 2011/0032864 A1* | 2/2011 | Lee et al. | 370/315 |
| 2012/0106433 A1* | 5/2012 | Seo et al. | 370/315 |
| 2012/0195252 A1* | 8/2012 | Suga | 370/315 |
| 2012/0213061 A1* | 8/2012 | Chen et al. | 370/227 |
| 2012/0213148 A1* | 8/2012 | Saito et al. | 370/315 |
| 2013/0010677 A1* | 1/2013 | Youn et al. | 370/315 |
| 2013/0064171 A1* | 3/2013 | Zhang et al. | 370/315 |
| 2013/0208652 A1* | 8/2013 | Morioka et al. | 370/315 |

OTHER PUBLICATIONS

International Search Report and Written Opinion of Patent Cooperation Treaty (PCT), International Application No. PCT/US12/64226, Applicant Huawei Technologies Co., Ltd., date of mailing Feb. 1, 2013, 11 pages.

Singh, N. K., et al., "Energy Balance in Wireless Networks Using Connection Segmentation and Range Control," 2003, pp. 1871-1876.

"IEEE Standard for Informatin Technology—Telecommunications and information exchange between systems—Local and metropolitan area networks—Specific requirements," Part 11: Wireless LAN Medium Access Control (MAC) and Physical Layer (PHY) Specifications, IEEE Draft P802.11-REVmb™/D12, LAN/MAN Standards Committee of the IEEE Computer Society, Section 9.3.4 DCF Access Procedure, Nov. 2011, pp. 896-900.

Singh, M., et al., "Optimal Energy-Balanced Algorithm for Selection in a Single Hop Sensor Network," Department of Computer Science, University of Southern California, 10 pages.

* cited by examiner

Primary Examiner — Clemence Han
(74) Attorney, Agent, or Firm — Slater & Matsil, L.L.P.

(57) ABSTRACT

A method for operating a first station includes broadcasting identifying information during a contention period after obtaining access to a communications medium used to transmit messages. The method also includes receiving a transmission intended for an access point from a second station over the communications medium, and forwarding the transmission to the access point over the communications medium.

44 Claims, 10 Drawing Sheets ns under distributed channel access (DCA) using a function called distributed coordination function (DCF), which is based on a carrier sense multiple access with collision avoidance mechanism (CSMA/CA).
SYSTEM AND METHOD FOR DATA FORWARDING This application claims the benefit of U.S. Provisional Application No. 61/557,228, filed on Nov. 8, 2011, entitled "System and Method for Data Forwarding," which application is hereby incorporated herein by reference.

TECHNICAL FIELD

The present disclosure relates generally to digital communications, and more particularly to a system and method for data forwarding.

BACKGROUND

Wi-Fi, also referred to as Wireless Local Area Network (WLAN), uses IEEE 802.11 standards as an air interface (including physical and Media Access Control (MAC) layers). In IEEE 802.11, the communication channel (also commonly referred to as communications medium) is shared by stations under distributed channel access (DCA) using a function called distributed coordination function (DCF), which is based on a carrier sense multiple access with collision avoidance mechanism (CSMA/CA).

The DCF uses both physical and virtual carrier sense functions to determine the state of the communications medium. The physical carrier sense resides in the physical layer (PHY) and uses the energy detection and preamble detection to determine whether the communications medium is busy. The virtual carrier sense resides in the MAC layer and uses reservation information, e.g., a network allocation vector (NAV), in a duration field of MAC headers announcing impeding use of the communications medium. The communications medium is determined to be idle only when both the physical and virtual carrier sense mechanisms indicate it to be so.

SUMMARY OF THE DISCLOSURE

Example embodiments of the present disclosure which provide a system and method for data forwarding.

In accordance with an example embodiment of the present disclosure, a method for operating a first station is provided. The method includes broadcasting, by the first station, identifying information during a contention period after obtaining access to a communications medium used to transmit messages. The method also includes receiving, by the first station, a transmission intended for an access point from a second station over the communications medium, and forwarding, by the first station, the transmission to the access point over the communications medium.

In accordance with another example embodiment of the present disclosure, a method for operating a second station is provided. The method includes obtaining, by the second station, access to a communications medium during a contention period, the communications medium used to transmit messages, and determining, by the second station, if a first station is available for message forwarding. The method also includes transmitting, by the second station, a message intended for an access point to the first station if the first station is available for message forwarding, and transmitting, by the second station, the message intended for the access point directly to the access point if the first station is not available for message forwarding.

In accordance with another example embodiment of the present disclosure, a method for operating an access point is provided. The method includes receiving, by the access point, a message from a first station over a communications medium used to transmit messages, the communications medium temporarily accessed by the first station, the message originally transmitted by a second station. The method also includes transmitting, by the access point, an acknowledgement for the message to the second station.

In accordance with another example embodiment of the present disclosure, a forwarder station is provided. The forwarder station includes a transmitter, and a receiver operatively coupled to the transmitter. The transmitter broadcasts identifying information during a contention period after obtaining access to a communications medium used to transmit messages, and forwards a transmission intended for an access point from a second station to the access point over the communications medium. The receiver receives the transmission intended for the access point from the second station over the communications medium.

In accordance with another example embodiment of the present disclosure, a second station is provided. The second station includes a processor, and a transmitter operatively coupled to the processor. The processor obtains access to a communications medium during a contention period, the communications medium used to transmit messages, and determines if a first station is available for message forwarding. The transmitter transmits a message intended for an access point to the first station if the first station is available for message forwarding, and transmits the message intended for the access point directly to the access point if the first station is not available for message forwarding.

One advantage of an embodiment is that non-forwarding stations with stringent power constraints may be able to conserve energy by transmitting to forwarding stations, thereby increasing their battery life, for example.

A further advantage of an embodiment is that the use of forwarding stations help to alleviate a power consumption imbalance of stations closely located to an access point and stations remotely located from the access point.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to data forwarding. For example, at a forwarding station, the forwarding station broadcasts identifying information during a contention period after obtaining access to a communications medium used to transmit messages, and receives a transmission intended for an access point from a second station over the communications medium. The forwarding station also forwards the transmission to the access point over the communications medium. As another example, at a non-forwarding station, the non-forwarding station obtains access to a communications medium used to transmit messages, and determines if a first station is available for message forwarding. The non-forwarding station also transmits a message intended for an access point to the first station if the first station is available for message forwarding, and transmits the message intended for the access point directly to the access point if the first station is not available for message forwarding. As another example, at an access point, the access point receives a message from a first station over a communications medium, the message is originally transmitted by a second station. The access point also transmits an acknowledgement for the message to the second station.

The present disclosure will be described with respect to example embodiments in a specific context, namely an IEEE 802.11ah compliant communications system that supports simplified, battery powered devices. The disclosure may also be applied, however, to other communications systems, both standards compliant (including those compliant with other versions of IEEE 802.11) and non-standards compliant, that support simplified, battery powered devices.

Figure 1:
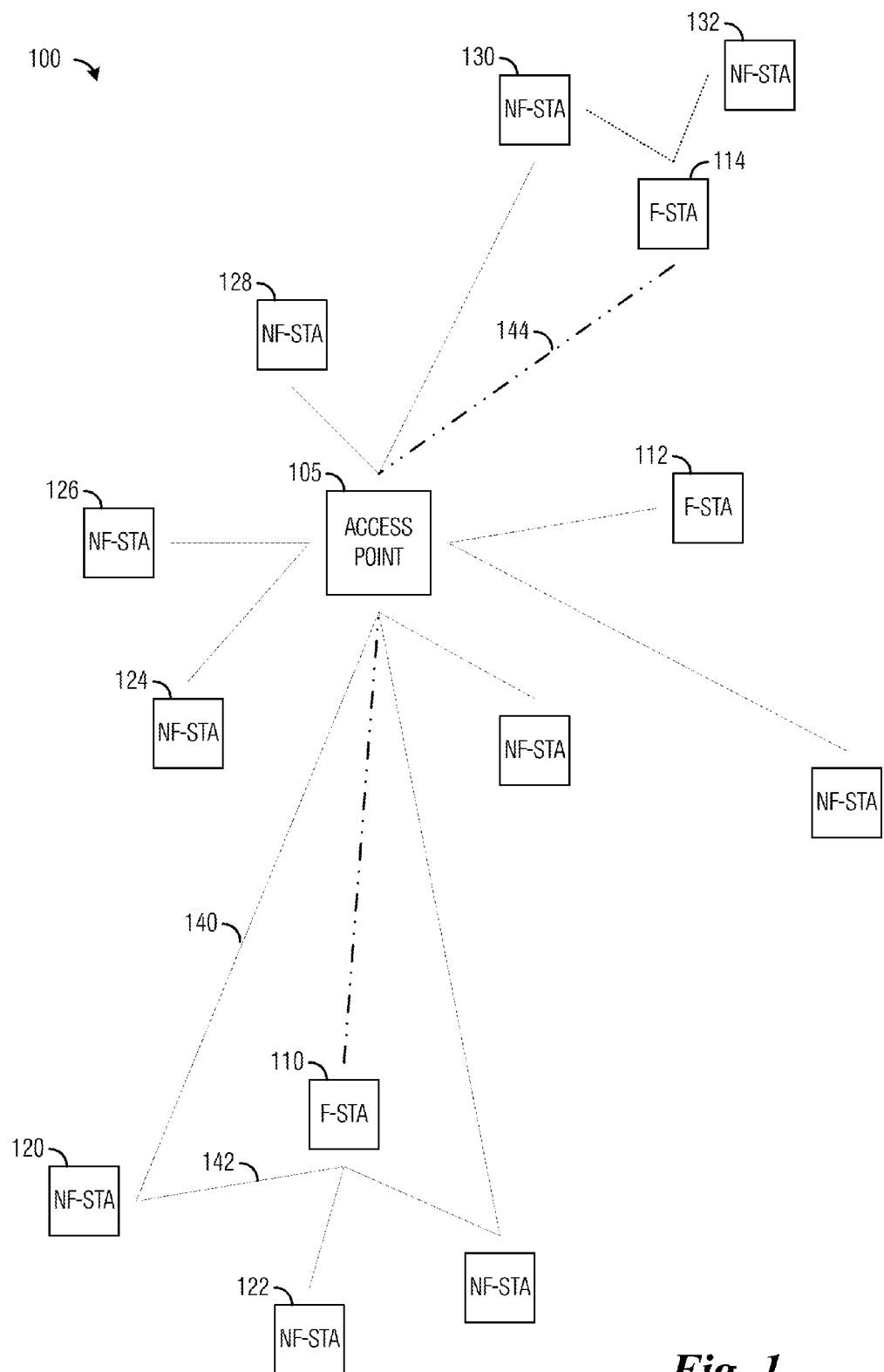
FIG. 1 illustrates an example communications system according to example embodiments described herein.

Recently, a new IEEE 802.11 task group, TGah, has been formed to prepare specifications for under 1 GHz WiFi. The 1 GHz WiFi as specified by TGah is mainly targeted towards sensor networks with traffic offloading from cellular networks being a secondary usage scenario. A requirement for the specifications is to support more than 6000 stations in a single Basic Service Set (BSS) that covers a large area, e.g., a 1 kilometer radius. In a BSS with a large radius, the outskirt stations, or equivalently remote stations, which are located far away from the AP, achieve a lower transmission rate and consume more energy for data transmissions, compared with the inner stations that are located closer to the AP. Moreover, when a remote station and an inner station transmit simultaneously, it is likely that only the remote station needs to retransmit the data as the AP may be able to decode the data of the inner station due to its higher signal strength. Retransmissions due to the capturing effect deteriorate the energy consumption of the remote stations. Therefore, the batteries of the remote stations will typically drain out faster than that of the inner stations. As such, the network will not be able to provide satisfactory service coverage when some stations die sooner, which is referred to as the energy consumption imbalance problem FIG. 1 illustrates a communications system 100. It is noted that communications system 100 may also be referred to as a BSS. Communications system 100 may be compliant to technical specifications as specified by TGah. Communications system 100 includes an access point (AP) 105 serving a plurality of stations. AP 105 serves a plurality of stations. As shown in FIG. 1, the stations in the plurality of stations may be classified into one of two types: a first type, referred to as forwarding stations (F-STA), includes stations that may forward messages from other stations to AP 105, and a second type, referred to as non-forwarding stations (NF-STA), includes stations that do not forward messages.

In general, an F-STA may be a station without stringent power constraints, such as stations that are powered by the electrical grid, have very large batteries, are capable of generating their own power, and the like. Examples of F-STAs may include personal computers, multimedia servers, information servers, dedicated relays, and the like. On the other hand, a NF-STA may be a station with power constraints, such as portable stations with small batteries, sensors, and the like. Examples of NF-STA may include sensors (such as weather sensors, security sensors, proximity sensors, and the like), cell phones, personal digital assistants, and the like. Another term used to commonly refer to NF-STAs is power constrained devices. It is noted that although a station may not be power constrained, it does not necessarily need to be an F-STA. As an example, a personal computer may not have necessary hardware and/or software to operate as a F-STA.

As shown in FIG. 1, AP 105 serves a plurality of F-STAs, such as F-STA 110-114, and a plurality of NF-STAs, such as NF-STA 120-132. Some NF-STA may transmit directly to AP 105 instead of transmitting through an F-STA, such as NF-STA 124, NF-STA 126, NF-STA 128. Furthermore, some NF-STA may transmit directly to AP 105 and transmit through an F-STA, such as NF-STA 120 with a direct transmission shown as transmission 140 and through F-STA 110 shown as transmission 142, and NF-STA 130. When an F-STA has a transmission to forward, it may transmit directly to AP 105, such as transmission 144 from F-STA 114. Additionally, some F-STA may not have any transmission to forward or it may not be operating as a forwarding station and may simply transmit its own transmission to AP 105, such as F-STA 112.

While it is understood that communications systems may employ multiple APs capable of communicating with a number of stations, a limited number are illustrated for simplicity.

Figure 2A:
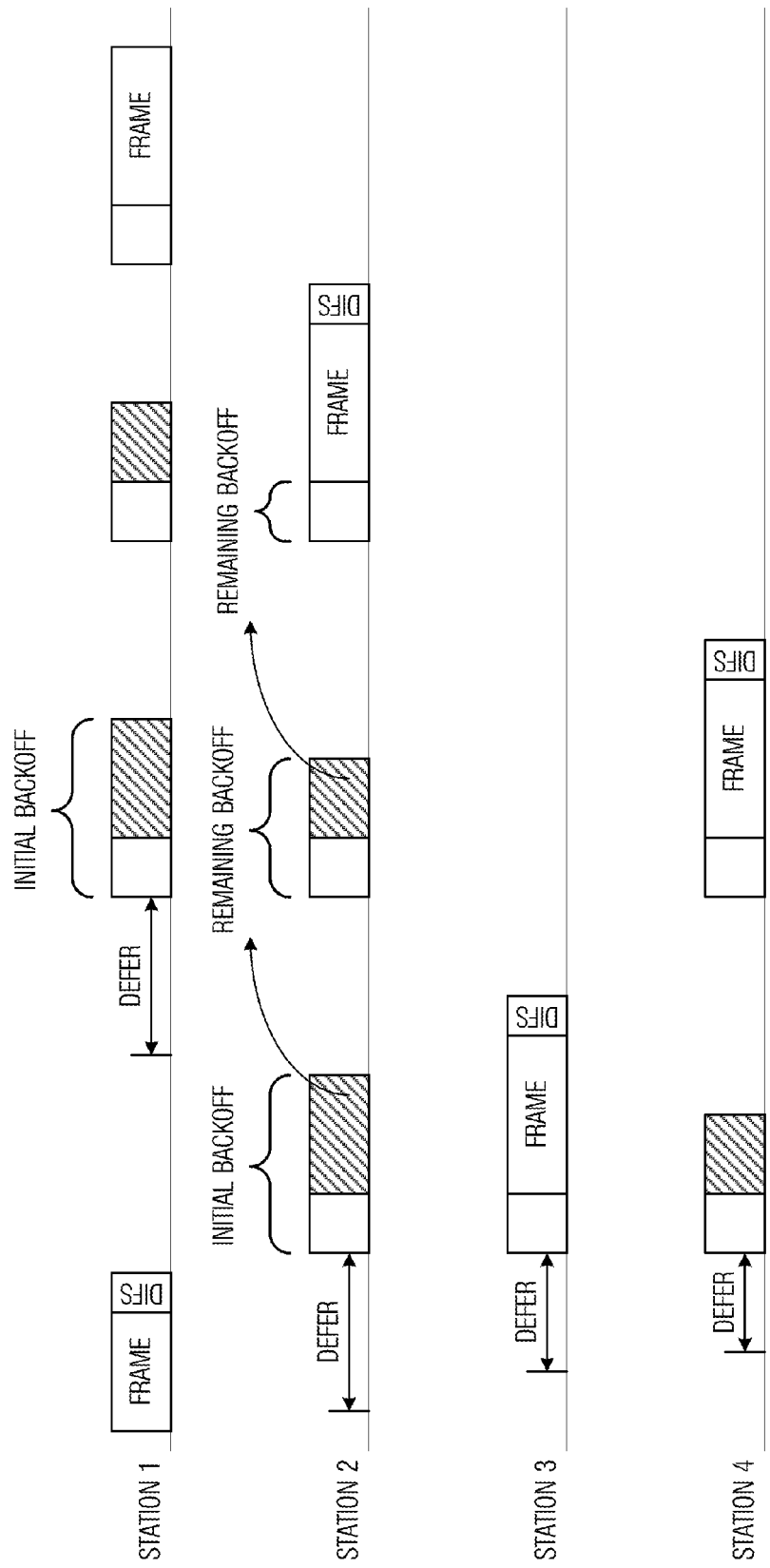
FIG. 2a illustrates an example a channel access mechanism of IEEE 802.11 according to example embodiments described herein.

FIG. 2a illustrates a channel access mechanism of IEEE 802.11. FIG. 2a shows a timing diagram 200 of transmissions made by stations contending for access to the communications medium. Contention for access to the communications medium is also commonly referred to as obtaining ownership of the communications medium. In general, a station performs a clear channel assessment (CCA) by sensing the communications medium for a specified duration, e.g., a distributed coordination function (DCF) inter-frame space (DIFS), before it attempts to transmit a frame. If the communications medium is sensed as busy, the station defers its transmission and keeps sensing the communications medium until the communications medium is sensed as being idle for a DIFS. Once the station senses that the communications medium has been idle for a DIFS, the station sets a random backoff counter. The backoff counter decreases by one for every idle slot that passes and freezes whenever the communications medium is sensed as busy. The station can only obtain access to the communications medium and transmit only when the backoff counter reaches zero.

The energy consumption imbalance problem associated with stations located at different locations discussed previously may be discussed in greater detail in an example. In the example, assume all stations use the same transmission power, $P_t$, which typically ranges from 20-30 dBm, and the background noise, N, and is typically around −90 dBm. In wireless communications, a signal attenuates with the communication distance d, and a path loss attenuation model normally used is expressible as $P_L=8+37.6*\log_{10}(d)$. A station may adapt the data transmission rate according to the received signal to noise ratio (SNR). Basically, the energy consumption of a successful transmission includes the energy used for data transmission, reception of acknowledgement, channel sensing, and data processing. The energy used for channel sensing and data processing usually does not vary much among different stations of the same type, and it is denoted herein as a constant $E_p=10^{-5}$ J per packet for analytical simplicity. Then, for a given payload of data packet and transmission power, the transmission energy, $E_t$, may be determined by the transmission time or the transmission rate, which is dependent on the transmission distance, and is expressible as $$E_t = P_t * T_d$$
$$= P_t * \left(T_{PHY} + T_{MAC} + \frac{L_{Data}}{R}\right)$$
$$= P_t * \left(T_{PHY} + T_{MAC} + \frac{L_{Data}}{W\log_2(1 + (P_t - PL)/N)}\right),$$

where $T_{PHY}$, $T_{MAC}$ are the times due to transmit PHY and MAC overheads, respectively, W is the signal bandwidth, and $L_{Data}$ is the payload of a data packet. Similarly, the reception energy is $E_r=T_{PHY}+T_{MAC}$, with an empty ACK packet.

Figure 2B:
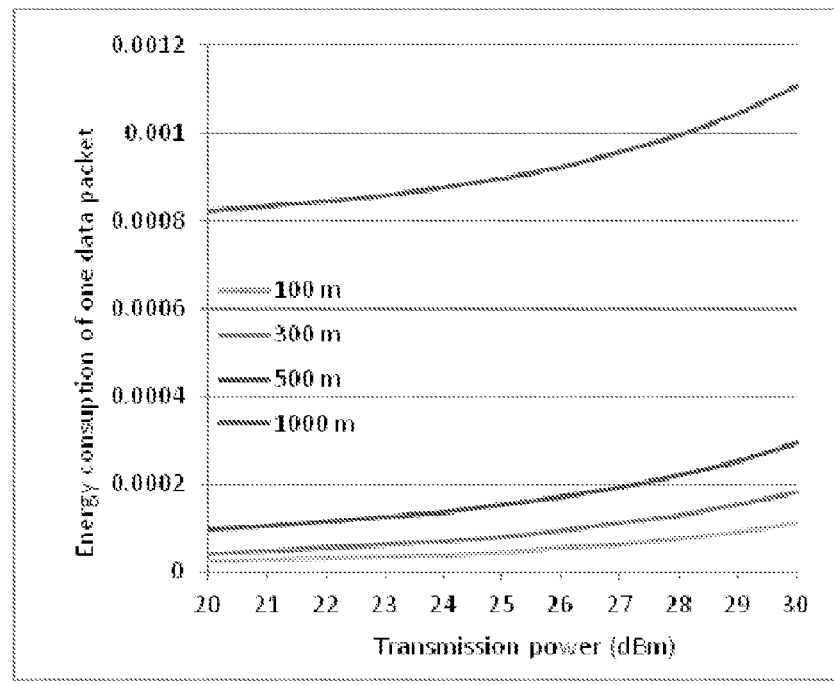
FIG. 2b illustrates an example graph of energy consumption of a single successful packet transmission versus transmission power at a variety of communications distances according to example embodiments described herein.
Figure 2C:
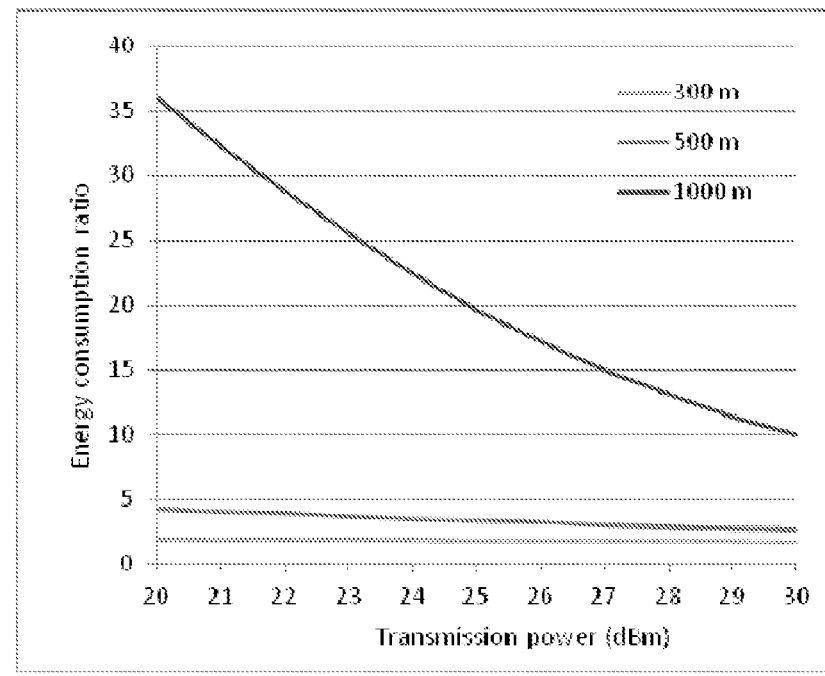
FIG. 2c illustrates an example graph of energy consumption ratio of stations located at a variety of communications distances versus a station located at 100 meters versus transmission power according to example embodiments described herein.

FIG. 2b illustrates a graph of energy consumption of a single successful packet transmission versus transmission power at a variety of communications distances. It is noted that energy consumption increases significantly with communications distance, especially when the transmission power is low. FIG. 2c illustrates a graph of energy consumption ratio of stations located at a variety of communications distances versus a station located at 100 meters versus transmission power. It is noted that the remote stations, e.g., stations located 1000 meters away from the AP, consume multiples of ten times more energy than stations that are 100 meters away from the AP (i.e., the inner stations). Therefore, the remote stations will exhaust their batteries at a much greater rate.

Energy consumption balance is a special concern in wireless sensor networks because sensors (an example of a power constrained station) are usually powered by batteries with limited capacity, and energy consumption imbalance may lead to a network partition that degrades the service provisioning when some sensors are out of energy and therefore are out of service while some others remain active. Energy consumption imbalance and efficiency problems in a wireless sensor network are investigated by Nitin Kumar Singh, Rahul Simha, and Bhagi Narahari in a paper entitled "Energy Balance in Wireless Networks Using Connection Segmentation and Range Control," in Wireless Communications and Networking, 2003, WCNC 2003, 2003 IEEE (Vol. 3, pp. 1871-1876), which is incorporated herein by reference. Basically, in a sensor network, data is delivered from sensors located in different areas to the AP. A research issue addressed is to balance the energy consumption in the sensors that are closer to the AP because geographically there are a much smaller number of sensors close to the AP compared with the sensors that are far away from the AP. The energy consumption imbalance problem in sensor networks is that sensors close to the AP drain out energy much faster than remote sensors due to much heavier traffic demand arising from forwarding the transmissions of the remote sensors.

However, IEEE 802.11ah presents a different application scenario in that the sensors use very low power for transmission over a long distance. In this scenario, the remote sensors will consumes more energy than inner sensors and will deplete their batteries at a faster rate than inner sensors, which is different from the problem studied in the existing works. Additionally, sensors as deployed in IEEE 802.11ah usually have very low duty cycles, e.g., on the order of tens of minutes or hours. Hence, it may be too energy-consuming for sensors to stay awake to help forward data from other sensors. Therefore, the previous works on the energy consumption imbalance issues do not address problems in IEEE 802.11ah sensor networks.

Figure 3:
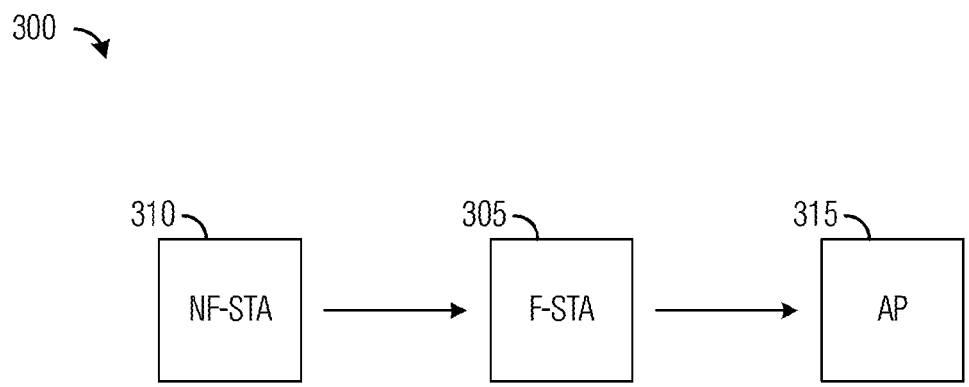
FIG. 3 illustrates an example high-level view of operations of an F-STA according to example embodiments described herein.

FIG. 3 illustrates a high-level view of operations 300 of an F-STA. As shown in FIG. 3, an F-STA 305 receives a transmission from an NF-STA 310 and forwards the transmission to an AP 315. It is noted that operations 300 illustrates F-STA 305 serving as a forwarding station for uplink transmissions. It is also noted that F-STA 305 serves as a single hop forwarding station. The example embodiments presented herein may be extended to multiple hop forwarding station operation. In addition to forwarding data from NF-STAs (including NF-STA 310), F-STA 305 may aggregate data from remote stations to help improve energy transmission efficiency and alleviate the energy consumption imbalance problem.

Figure 4:
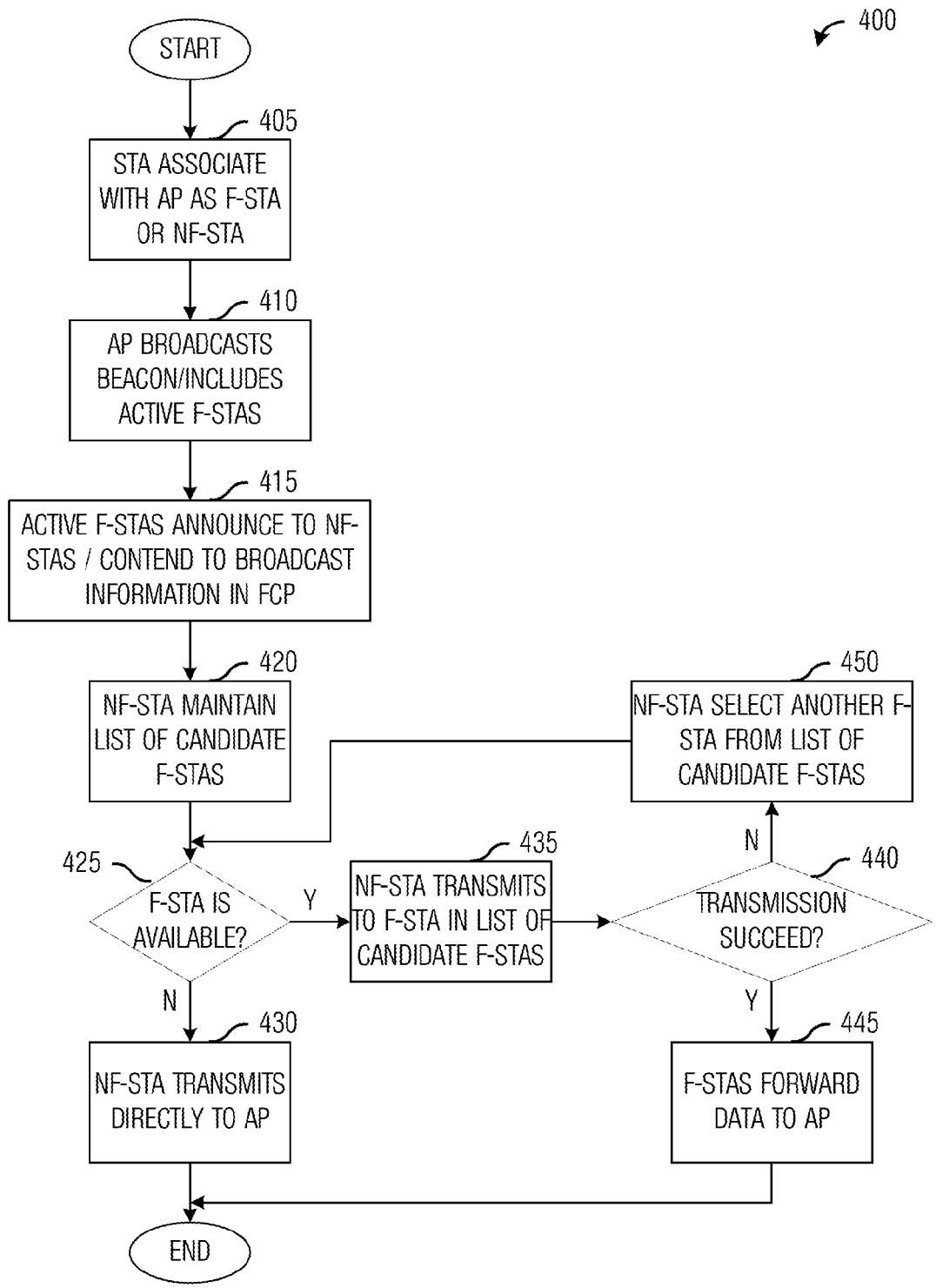
FIG. 4 illustrates an example flow diagram of operations in providing data forwarding according to example embodiments described herein.

FIG. 4 illustrates a flow diagram of operations 400 in providing data forwarding. Operations 400 may be indicative of operations occurring in several entities in an IEEE 802.11ah compliant communications system with NF-STAs to help improve energy transmission efficiency and alleviate the energy consumption imbalance problem.

Operations 400 may begin with the stations in the communications system associating with an AP (block 405). The stations may associate with the AP as either an F-STA or an NF-STA. How each station associates with the AP may be dependent on a number of factors, including type (e.g., sensor, PC, server, aggregator, and the like), power constraint (e.g., none, severe, large battery, small battery, self powered, and the like), proximity to the AP (i.e., distance from the AP), and the like. As an example, a station may embed an indicator of F-STA or NF-STA status in an association request message (or other messages transmitted during the association process) transmitted to the AP. The indicator may be referred to as a forwarding indicator. Additionally, the stations associating as F-STAs may inform the AP (and potentially other stations) how long they can operate as F-STAs. As an example, a station may state that it can operate as an F-STA for a certain percentage of the time or a specified duration. For instance, the station may operate as an F-STA from time to time or the station may operate as an F-STA all of the time.

Also, the AP may request that a station operate as an F-STA. As an example, the AP may determine that it is lacking sufficient F-STAs in a particular area of its communications system and it may select one or more stations operating in the area that do not have significant power constraints to operate as F-STAs (for at least a part of the time). As another example, the AP may receive reports of low battery warnings from stations in a particular area of its communications system. The AP may then request one or more stations operating in the area that do not have significant power constraints to operate as F-STAs (for at least a part of the time).

The AP may broadcast a periodic beacon (block 410). In some or all of the broadcasts of the periodic beacon, the AP may include information about stations operating as F-STAs and possibly their operating channel(s). As an example, the AP may include a list of stations operating as F-STAs operating at one or multiple channels that will be participating in a forwarder contention period (FCP). The AP may separately identify each of the stations. The stations identified by the AP may be referred to as active F-STAs. Alternatively, the stations operating as F-STAs may have been assigned into one or more groups during association and the AP may simply identify one or more groups that will be participating in the FCP. The duration of the FCP may have been determined by the AP based on received F-STA information, such as received during association. The duration of the FCP and the identification of the one or more groups participating in the FCP may be received together.

Since a large number of stations contending for the communications medium may prevent any station from successfully accessing the channel the AP may select only a subset of F-STAs as active F-STAs for a single FCP. By selecting a relatively small number of F-STAs to transmit their identifying information during a single FCP, the AP reduces the probability of collisions resulting from large numbers of F-STAs contending for the communications medium, which would significantly degrade the performance of the communications system. As an example, if the total number of F-STAs exceeds a specified number, the AP may elect to divide the F-STAs into multiple groups according to their AIDs, MAC addresses, and the like, with one group containing F-STAs with odd MAC addresses and another group containing F-STAs with even MAC addresses, and the like. The AP may then select one of the two groups for contention during a subsequent FCP. Other grouping techniques may be used in place of AIDs, MAC addresses, and the like.

The active F-STAs that may announce themselves to the other stations (the NF-STAs) as active forwarders (or equivalently, active forwarder stations) during the FCP (block 415). The active F-STAs may announce themselves by transmitting identifying information to the other stations. The active F-STAs may also include some other information in its transmission, e.g., channel information between the forwarder and the AP, and the like, to facilitate the forwarder selection of other NF-STAs. Typically, only the active F-STAs (the stations operating as F-STAs identified by the AP during a beacon broadcast as discussed above) may contend for channel access and transmit identifying information during the FCP. Therefore, not all stations operating as F-STAs may be allowed to announce themselves in a single FCP. During the FCP, only the active F-STAs may contend for access to the communications medium (i.e., ownership of the communications medium) in order to make the announcements.

Furthermore, an active F-STA can announce itself to the other stations by broadcasting a message at any time when it has access to the communications medium. In an alternative example embodiment, the AP may poll an active F-STA (e.g., using a CF-Poll, a power save multi-poll (PSMP), and the like) so that the active F-STA can broadcast its information in a contention free manner. To further avoid severe contentions among active F-STAs, the AP may select only a subset of all stations operating as F-STAs for any single FCP. As an example, in the beacon frame, the AP lists some of the stations operating as F-STAs that shall contend for the communications medium to announce their information during the FCP. Alternatively, the AP may select a set of active F-STAs so that the active F-STAs can forward data from other stations during a specific duration (e.g., an AP beacon period), and such information can be included in the AP's beacon with a list of addresses of the active F-STAs (e.g., association identifiers (AIDs), MAC addresses, some other identifiers, and the like).

The other stations, upon hearing the broadcast information of the active F-STAs, each station may decide whether it needs to use an F-STA, and if needed, which F-STA(s) it should select. If a station decides to make use of an F-STA, the station maintains a list of candidate F-STAs (block 420). The station may generate the list of candidate F-STAs from all of the broadcast information from the active F-STAs that it is capable of hearing. The station may sort the list of candidate F-STAs in accordance with measured signal strength, received signal strength, channel quality indicator, and the like. The station may make some of the measurements using the broadcast information transmitted by the active F-STAs themselves. The station may also use some information, such as channel quality indicator and information, provided by others, such as the AP. The station may also discard some of the candidate F-STAs in the list of candidate F-STAs in order to arrive at a more manageable list. As an example, the station may select the top N candidate F-STAs for inclusion in the list of candidate F-STAs, where N is an integer number greater than one, and discarding the remaining active F-STAs.

When the station has data to transmit, it may select a candidate F-STA from the list of candidate F-STAs and check to determine if the selected F-STA is available (block 425). As an example, the station may know when the selected F-STA has specified that it is operating as a forwarder. If the selected F-STA is not available, the station may select another candidate F-STA. If the station has exhausted its list of candidate F-STAs, the station may transmit the data directly to the AP (block 430). It is noted that although not explicitly stated, the station obtains access to the communications medium prior to transmitting the data.

If the selected F-STA is available, the station may transmit its data to the selected F-STA in the following data transmission period (block 435). It is noted that although not explicitly stated, the station obtains access to the communications medium prior to transmitting the data. The station may use the selected F-STA or re-select a new candidate F-STA for the subsequent data transmissions. The station may perform a check to determine if the transmission to the selected F-STA succeeded (block 440). If the selected F-STA successfully received the data transmission from the station, the selected F-STA replies with an ACK message to the station. If the selected F-STA received the data transmission but it was garbled or otherwise not decodable, the selected F-STA may reply with a negative ACK message to the station. The station may determine that the data transmission failed if it does not receive an ACK or a negative ACK message within a specified amount of time. In another example embodiment, the selected F-STA does not reply an ACK or negative ACK message to the station, but simply forwards the received data transmission from the station to the AP. After receiving the data transmission, the AP replies with an ACK or a negative ACK message to the station directly. If the data transmission succeeded, the selected F-STA may forward the data transmission to the AP (block 445). If the data transmission did not succeed, the station may select another candidate F-STA from the list of candidate F-STAs (block 450) and return to block 425 to attempt to re-transmit the data transmission. If a selected F-STA receives more than one data transmission from one station or from multiple stations, the selected F-STA can aggregate the transmissions together and transmit the aggregated transmissions to the AP to further improve on transmission efficiency.

Figure 5:
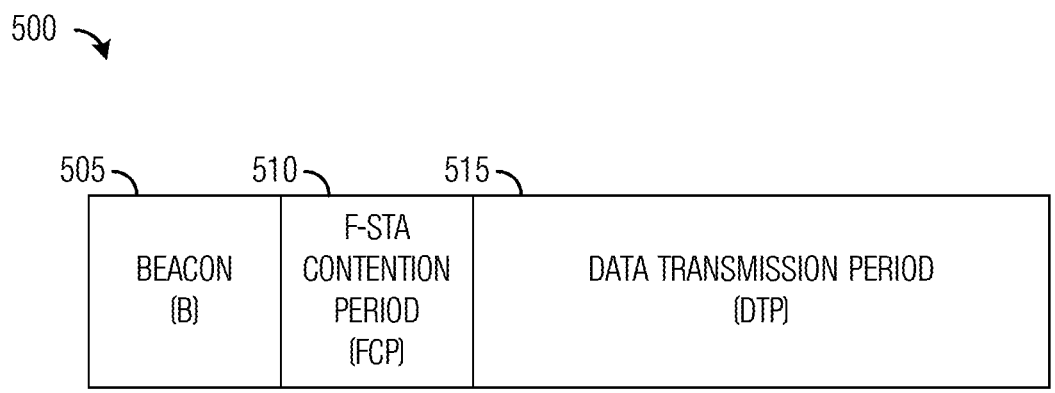
FIG. 5 illustrates an example time structure of a protocol supporting F-S TA operation according to example embodiments described herein.

FIG. 5 illustrates a time structure 500 of a protocol supporting F-STA operation. Time structure 500 includes a beacon period 505, a FCP 510, and a data transmission period (DTP) 515. During beacon period 505, the AP may broadcast a beacon and may identify one or more active F-STAs. During FCP 510, the active F-STAs may contend for access to the communications medium in order to transmit identifying information to the other stations in the communications system. The other stations in the communications system may use the identifying information to generate lists of candidate F-STAs. The other stations may also make measurements using the transmissions of the identifying information to sort and possibly cull their lists of candidate F-STAs. During DTP 515, the other stations may transmit to the AP and to the active F-STAs, and the F-STAs may forward received data transmissions to the AP, as well as transmit their own data transmissions to the AP.

It is noted that time structure 500 may be a single example of possible time structures. Other time structures are possible. As an example, the F-STAs may broadcast their identifying information at any time (not limited to FCP 510) or the F-STAs may broadcast their identifying information following a schedule determined by the AP (e.g., in response to a CF-poll, a PSMP, and the like). As another example, in beacon period 505, the AP indicates the active F-STAs that can contend during a subsequent FCP. Alternatively, the AP indicates the active F-STAs that can forward the data transmissions from the other stations during a subsequent DTP, along with a duration of the subsequent DTP. The subsequent DTP may have an implicit period that encompasses a time span between the subsequent FCP and the next beacon period.

During FCP 510, the active F-STAs may contend for the communications medium to broadcast their identifying information, which may be referred to as a forwarder beacon (F-Beacon) or forwarder information or the like. Some of the active F-STAs may wish to operate as forwarder stations for a portion of the time. As an example, a sensor powered by a sustainable energy supply may forward data transmissions of other stations when its battery level is high, but when its battery level drops, it may discontinue data transmission forwarding. Therefore, the sensor may not always serve as an F-STA. Therefore, the sensor may announce, such as in its identifying information, that it will serve as a forwarder station. Then, after some time, it may announce again, such as in its identifying information, that it will no longer server as a forwarder station. Alternatively, the sensor may announce a duration of its service as a forwarder station. As an example, the sensor may announce, such as in its identifying information, that it will remain operating as a forwarder station for n beacon periods, where n is a positive integer value. Then, after the n-th beacon period, the sensor may stop forwarding data transmissions. If a station receives a data transmission when it is not operating as a forwarder station, the station may reject the data transmission by sending a negative ACK or some other message to inform the source of the data transmission that the station is no longer serving as a forwarder station.

In order to allow flexible status changes of F-STAs and NF-STAs, an FCP is set to allow the active F-STAs to inform other stations of their current status. The active F-STAs can also announce their current status at any other time in general. A broadcast message from an active F-STA may include the MAC address or other identifier (e.g., BSSID, AID, and the like) of the associated AP so that the other stations hearing the message can decide whether this particular active F-STA can help forward its data to the AP. In order to facilitate the selection of active F-STAs by the other stations, F-STA may include selection information, such as channel state information (CSI) between the active F-STA and the AP, buffer capacity of the F-STA, forwarding capability in terms of successful transmission probability of the F-STA, filter condition of the F-STA, forwarding priority list of the F-STA, and the like. By measuring a gain of channels between the NF-STAs and the AP (and the active F-STAs), each NF-STA may decide whether it should use the particular active F-STA for data forwarding or not. An example selection criterion may be to determine whether the energy saving of the NF-STA with the help of the particular active F-STA is larger than a threshold, when compared to a direct transmission between the NF-STA and the AP, which may be expressible as $$E_d - E_f > E_{threshold}, \quad (1)$$

where $E_d$ is the energy used for direct transmission and $E_f$ is the energy used for transmitting data with the help of the particular active F-STA, and $E_{threshold}$ is the threshold. Since the F-STA may aggregate data for forwarding, STAs may also preferably select a F-STA with a larger buffer capacity and/or transmission capacity (e.g., a F-STA with multiple input, multiple output (MIMO) support and therefore potentially achieve a higher transmission rate). Hence, MIMO information, such as MIMO output capability, power capability, buffer capacity, and the like, may also be a part of the selection information. In CSMA/CA based WiFi system, STAs in different locations may have different channel access probabilities and successful transmission probabilities, and thus has different forwarding capabilities. A NF-STA may preferably select an F-STA that has a higher forwarding capability and/or successful transmission probability to ensure efficient data forwarding.

On the other hand, F-STAs may also have some constraints on the data forwarding. These constraints may be used by the F-STAs as an access filter, or simply a filter, to select NF-STAs for data forwarding purposes. Hence, the access filter may also be a part of the selection information. The access filter may be used by an F-STA to select NF-STAs and/or data traffic and only those NF-STAs and/or data traffic selected in accordance with the access filter will be forwarded by the F-STA. As an example, some F-STAs may only forward data of sensor STAs with low traffic load, while others may only forward data from offloading NF-STAs, and some other F-STAs may forward multimedia traffic only. Additionally, some F-STAs may be deployed with N antennas and do not forward data from a NF-STA with M antennas (where M is greater than N), or a F-STA has a priority list on the type of data, traffic loads, or types of STAs for data forwarding and will generally only forward data (or data from STAs) meeting the priority list. By broadcasting such constraints, access filter, or priority list, the F-STA may allow NF-STA to decide whether it satisfies the constraints (or access filter) and can use the F-STA for data forwarding. During the FCP, each NF-STA may receive multiple messages from various active F-STAs. In this situation, an NF-STA may list all possible candidate F-STAs and potentially sort them in the descending order of selection information condition, e.g., based on the energy saving $E_d$-$E_f$, channel quality, and the like.

After the FCP, stations (including both F-STAs and NF-STAs) may transmit their data (such as in a DTP). If no candidate F-STA in an NF-STA's list of candidate F-STAs satisfies the condition expressed in Inequality (1) or any other selection condition, the NF-STA may transmit to the AP directly. Otherwise, the NF-STA will transmit its data to a candidate F-STA in the list of candidate F-STAs (which, for example, may be the one provides the highest energy gain to the NF-STA, or it may provide some other benefit, e.g., the NF-STA can use power control to transmit data at a very low power to the candidate F-STA). It is also possible that the selected F-STA is no longer actively functioning as a forwarder station and the NF-STA has not successfully updated its list of candidate F-STAs with this information. In such a situation, the data transmission to the selected F-STA may fail as the selected F-STA may not send back an ACK to the NF-STA (or it may reply with a negative ACK). After a transmission failure, the NF-STA can check its list of candidate F-STAs and select another candidate F-STA for data transmission. Similarly, if no candidate F-STA is currently available for data forwarding, the NF-STA may have to transmit its data to the AP directly.

Figure 6:
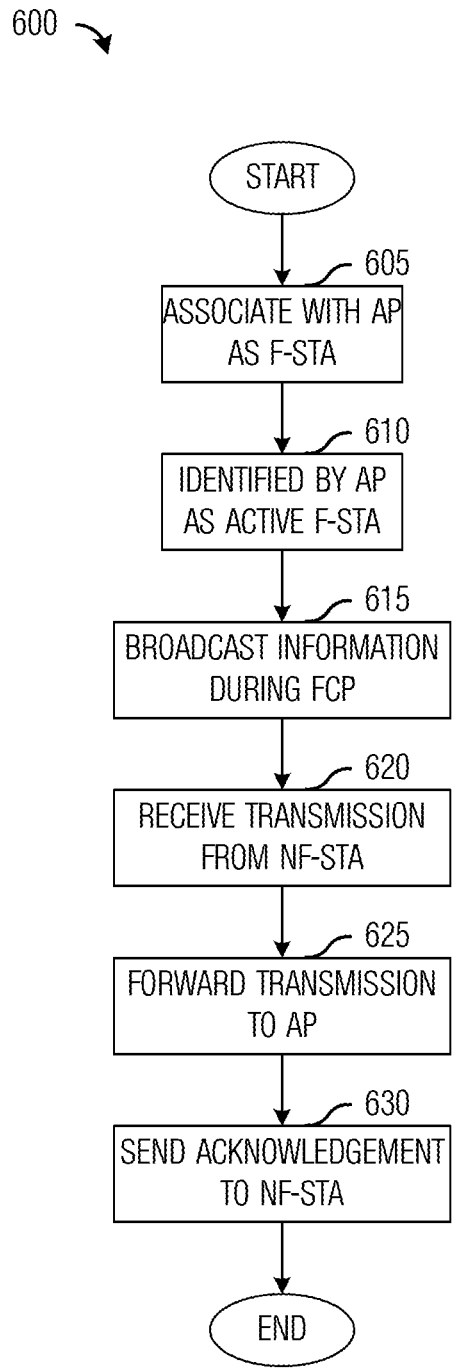
FIG. 6 illustrates an example flow diagram of operations occurring at a station as the operates as an F-STA according to example embodiments described herein.

FIG. 6 illustrates a flow diagram of operations 600 occurring at a station as the operates as an F-STA. Operations 600 may be indicative of operations occurring in a station as the station operates as an F-STA and forwards data transmissions.

Operations 600 may begin with the station associating with an AP as an F-STA (block 605). The station may operate as an F-STA full time or part time. The station may be identified by the AP as an active F-STA for an upcoming FCP (block 610). The station may be identified as an active F-STA when it receives an active forwarder indicator from the AP. The active forwarder may be in the form of an identifier associated with the station, such as its MAC address, AID, group identifier, and the like. Being identified as an active F-STA may allow the station to contend for the communications medium during the FCP and broadcast identifying information to other stations after obtaining access to the communications medium (block 615). It is noted that rather than being identified by the AP and then contending for the communications medium during the FCP, the station may receive a transmission, such as a PS-poll, a PSMP, and the like, from the AP, which may permit the station to broadcast identifying information without having to contend for the communications medium.

The station may receive a data transmission from a NF-STA, the data transmission intended for the AP (block 620). The data transmission may be received over the communications medium, and may occur after the FCP. If the data transmission was received without problems, the station may forward the data transmission to the AP (block 625) as well as send an ACK to the NF-STA (block 630). It is noted that although not explicitly stated, the station obtains access to the communications medium prior to transmitting the data. However, if the data transmission was received with problems, the station may send a negative ACK to the NF-STA. Furthermore, if the station receives multiple data transmissions from the NF-STA or from multiple NF-STA, the station may aggregate the data transmissions prior to forwarding the data transmissions to the AP. It is noted that the F-STA may use one or more channels to forward the data transmission(s).

Figure 7:
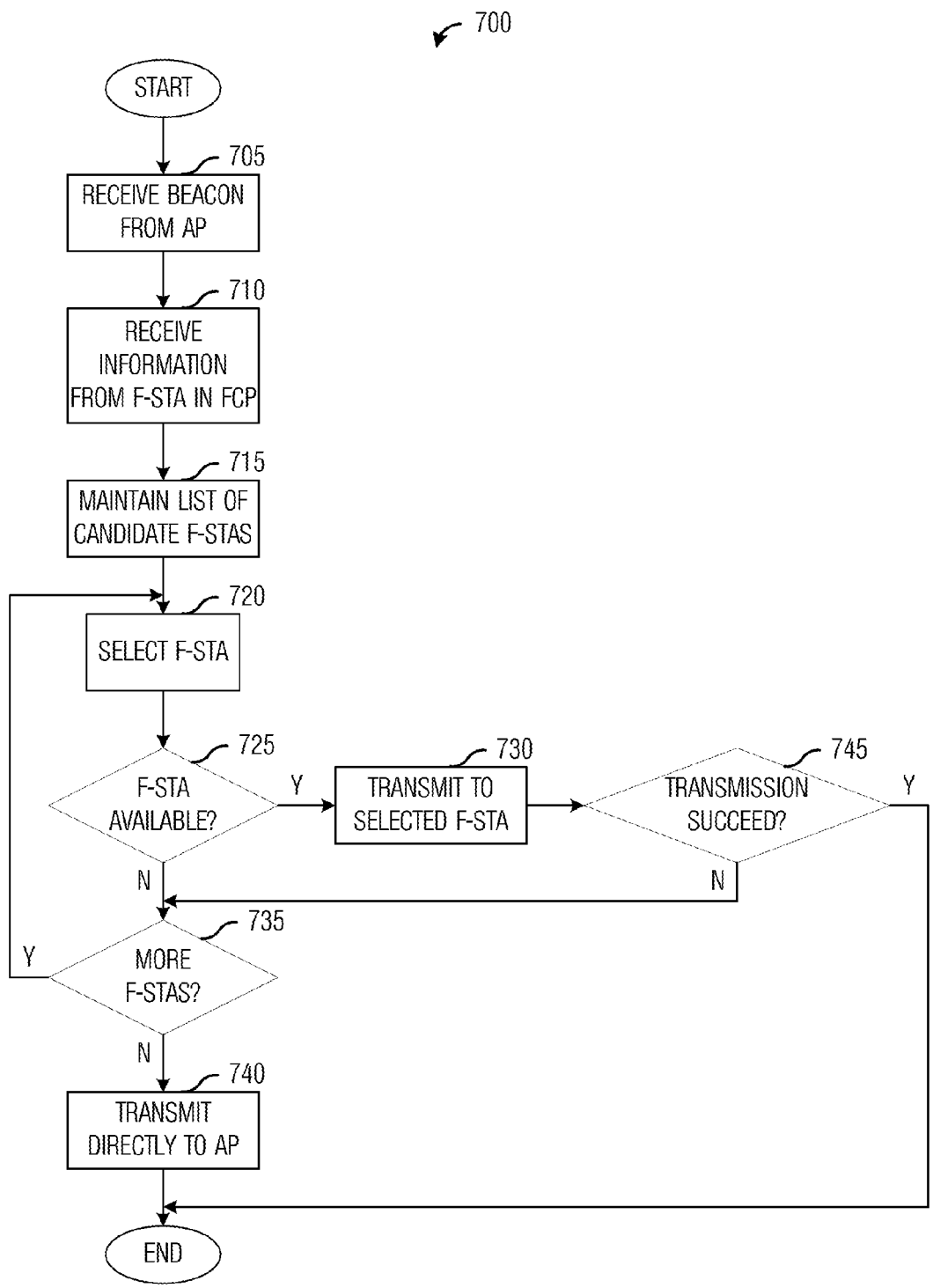
FIG. 7 illustrates an example flow diagram of operations occurring at a station as the station operates as an NF-STA according to example embodiments described herein.

FIG. 7 illustrates a flow diagram of operations 700 occurring at a station as the station operates as an NF-STA. Operations 700 may be indicative of operations occurring in a station as the station operates as an NF-STA and transmits data transmissions to an AP.

Operations 700 may begin with the station receiving a beacon from the AP (block 705). The beacon may include an identification of F-STAs that will be active during a subsequent FCP, i.e., active F-STAs. The station may receive identifying information from an active F-STA during the FCP (block 710). The identifying information may identify the active F-STA. The identifying information may also include information about an availability of the active F-STA, e.g., an indicator indicating that the active F-STA is available for forwarding data transmissions, an indicator indicating that the active F-STA is not available for forwarding data transmissions, an indicator of a span of time when the active F-STA is available for forwarding data transmissions, and the like. The identifying information may also include channel quality information for the communications medium between the AP and the active F-STA. The identifying information may also be used by the station to measure the channel quality between the active F-STA and the station. The station may use the channel quality to determine an energy saving gain for the active F-STA.

The station may maintain a list of candidate F-STAs generated in accordance with the identifying information and measurements thereof (block 715). The list of candidate F-STAs may be sorted, e.g., by the candidate F-STAs' channel quality information, energy saving gain, received signal strength, selection information (including access filter), and the like. Some poor performing candidate F-STAs may be eliminated. The station may obtain access to the communications medium and select a candidate F-STA from the list of candidate F-STAs when it has a data transmission to make (block 720) and check to determine if the selected F-STA is available (block 725). As an example, the station may select a F-STA from the list of candidate F-STAs that minimizes energy consumption, minimize transmission time, maximize throughput, maximize forwarding capacity of the selected F-STA, buffer capacity size, and the like, of the station as the selected F-STA. As another example, the station may also utilize an access filter provided by the candidate F-STAs to assist in the selection of the selected F-STA. As an example, the availability of the selected F-STA may be determined in accordance with the identifying information provided by the candidate F-STAs. If the selected F-STA is available, the station may transmit to the selected F-STA (block 730).

The transmission made by the station may include an indication that the transmission is to be relayed. The indication may be explicitly included in the transmission. As an example, the indication may be included in a field in the transmission, such as in a SIG field or in the MAC header of the transmission. The indication may be implicitly indicated, such as in a particular combination of MAC addresses. As an example, the transmission may include the presence of three MAC addresses, e.g., a source address, an F-STA address, and an AP address. The F-STA may note the presence of the three MAC addresses as an indication and relay the transmission.

If the selected F-STA is not available, the station may perform a check to determine if there are additional candidate F-STAs in the list of candidate F-STAs (block 735). If there are, the station may return to block 720 to select another candidate F-STA. If there are no more candidate F-STAs, the station may transmit directly to the AP (block 740).

The station may perform a check to determine if the transmission succeeded (block 745). As an example, the selected F-STA may send an ACK to the station if it successfully received the data transmission. As another example, the selected F-STA may send a negative ACK to the station if it was not able to successfully receive the data transmission. As another example, the AP may send an ACK to the station if it successfully received the data transmission. As another example, the AP may send a negative ACK to the station if it was not able to successfully receive the data transmission. If the transmission succeeded, then the station may be finished. If the transmission did not succeed, the station may return to block 735 to determine if there are additional candidate F-STAs to retry the data transmission.

The station may be able to trigger (e.g., initiate) the transmission of the identifying information by the active F-STAs during the FCP (i.e., block 615 of FIG. 6). Generally, when the station wakes up, the station waits for the F-STAs to announce themselves and then decides to transmit to one or more of the F-STAs. However, instead of waiting for the F-STAs, the station may be able to send a message, such as a PS-Poll, to trigger the announcement of the identifying information by the F-STAs. Alternatively, instead of a PS-Poll, the station may send a unicast message to a single F-STA (the station may transmit multiple unicast messages to multiple F-STAs), which may have been used by the station previously and initiate the announcement of the one or more F-STAs. As an example, the station may store information about F-STA(s) that it has used in the past and verify the condition and/or status of the one or more F-STA(s) using the above discussed mechanism.

Figure 8:
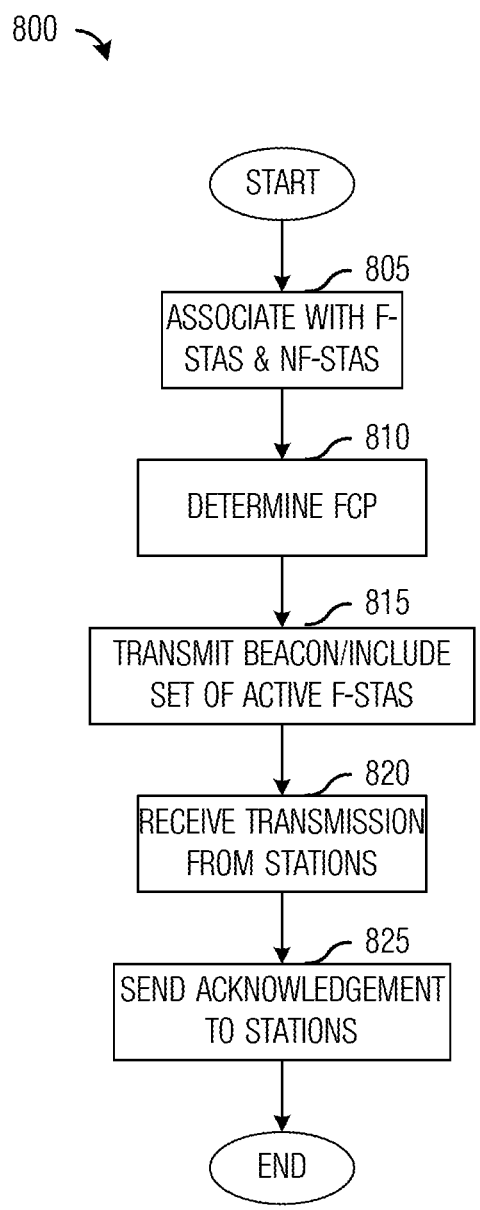
FIG. 8 illustrates an example flow diagram of operations occurring at an AP as the AP operates with F-STAs and NF-STAs according to example embodiments described herein.

FIG. 8 illustrates a flow diagram of operations 800 occurring at an AP as the AP operates with F-STAs and NF-STAs. Operations 800 may be indicative of operations occurring at an AP as the AP receives data transmissions from F-STAs and NF-STAs.

Operations 800 may begin with the AP associating with stations (block 805). The AP may associate with stations operating within its coverage area. The stations, during the association process, may inform the AP that they are F-STAs or NF-STAs. If a station does not inform the AP, the AP may, by default, determine that the station is an NF-STA. Alternatively, the AP may request that one or more of its stations operate as F-STAs. As an example, if there is an insufficient number of F-STAs, the AP may request that one or more stations operate as F-STAs for at least a portion of the time.

From the stations that associate as F-STAs or agreed to operate as F-STAs, the AP may determine an FCP (block 810). The AP may determine a duration of the FCP. The AP may also determine the active F-STAs that will be able to broadcast identifying information during the FCP. The active F-STAs may be a subset of the stations operating as F-STAs. If there are more stations operating as F-STAs then active F-STAs, then the AP may select the active F-STAs from the stations operating as F-STAs utilizing some of the techniques discussed previously. It is noted that the AP may determine that the FCP is not needed.

The AP may transmit a beacon (block 815). If the AP determined that there is to be an FCP, the AP may also transmit identifying information about the active F-STAs. The identifying information may be referred to as a active forwarder indicator. As an example, the AP may include a list of the active F-STAs. As another example, the F-STAs may be arranged into groups and the AP may include an indicator of a group of F-STAs that is to be active in the FCP. As another example, the F-STAs may be arranged into groups according to their identifying address, such as MAC address, AID, and the like, and the AP may include an indicator of which group of F-STAs is to be active in the FCP.

The AP may receive data transmissions from stations (block 820). Some of the data transmissions may be data transmissions forwarded by F-STAs, while some of the data transmissions may be direct data transmissions from NF-STAs and/or F-STAs that are transmitting their own data. The data transmission may be received over a plurality of channels. The AP may send acknowledgements in response to the data transmissions (block 825). As an example, if the AP successfully received a data transmission, the AP may send an ACK. If the AP was not successful in receiving a data transmission, the AP may send a negative ACK. The AP may send an acknowledgement (either an ACK or a negative ACK) to the source of the data transmission (i.e., an NF-STA) rather than an F-STA that forwarded the data transmission to the AP. However, if the F-STA transmitted directly to the AP, the AP may send the acknowledgement to the F-STA.

Figure 9:
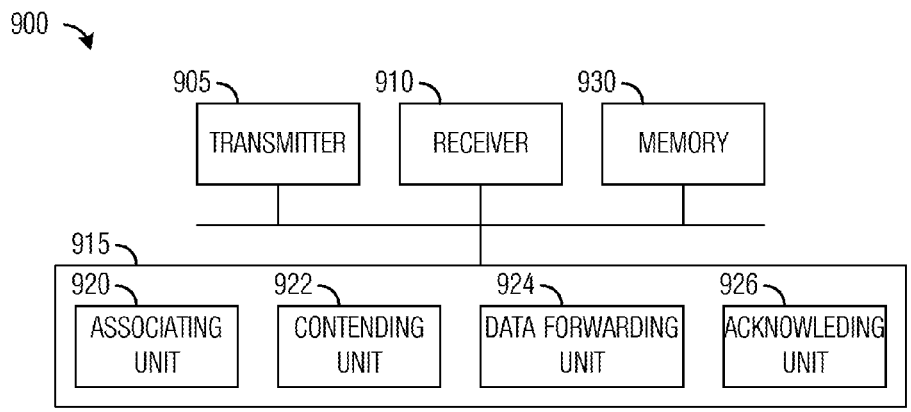
FIG. 9 illustrates an example first communications device according to example embodiments described herein.

FIG. 9 illustrates a diagram of a first communications device 900. Communications device 900 may be an implementation of an F-STA. Communications device 900 may be used to implement various ones of the embodiments discussed herein. As shown in FIG. 9, a transmitter 905 is configured to send messages, and the like, and a receiver 910 is configured to receive messages, and the like. Transmitter 905 and receiver 910 may have a wireless interface, a wireline interface, or a combination thereof.

An associating unit 920 is configured to perform an association procedure with an AP. Associating unit 920 may initiate a transmission of an association request to the AP. The association request may include an indicator of station type, e.g., F-STA or NF-STA. A contending unit 922 is configured to contend for access to the communications medium. Contending unit 922 performs the CCA, waiting, backoff counter control, communications medium status checking, and the like. A data forwarding unit 924 is configured to forward received data transmissions to the AP. If multiple data transmissions are received, data forwarding unit 924 may aggregate the multiple data transmissions together prior to forwarding. An acknowledging unit 926 is configured to generate an acknowledgement (e.g., an ACK or a negative ACK) in response to a received data transmission. A memory 930 is configured to store identifying information, received data transmissions, backoff counter, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while associating unit 920, contending unit 922, data forwarding unit 924, and acknowledging unit 926 may be software modules executing in a processor 915, such as a microprocessor, a digital signal processor, a custom circuit, or a custom compiled logic array of a field programmable logic array. Associating unit 920, contending unit 922, data forwarding unit 924, and acknowledging unit 926 may be modules stored in memory 930.

Figure 10:
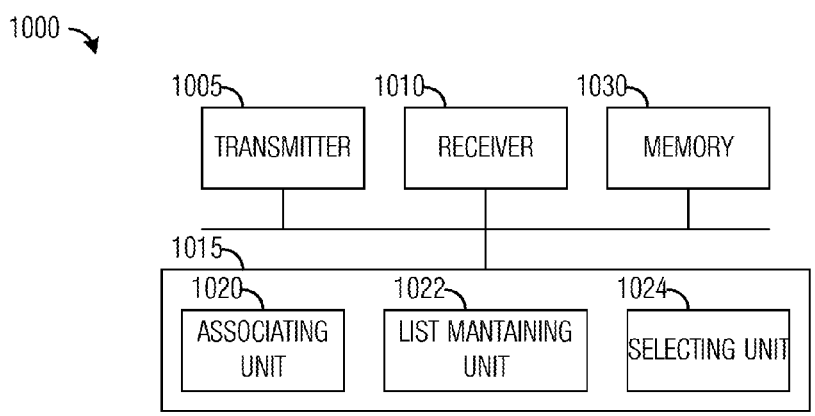
FIG. 10 illustrates an example second communications device according to example embodiments described herein.

FIG. 10 illustrates a diagram of a second communications device 1000. Communications device 1000 may be an implementation of an NF-STA. Communications device 1000 may be used to implement various ones of the embodiments discussed herein. As shown in FIG. 10, a transmitter 1005 is configured to send messages, and the like, and a receiver 1010 is configured to receive messages, and the like. Transmitter 1005 and receiver 1010 may have a wireless interface, a wireline interface, or a combination thereof.

An associating unit 1020 is configured to perform an association procedure with an AP. Associating unit 1020 may initiate a transmission of an association request to the AP. The association request may include an indicator of station type, e.g., F-STA or NF-STA. A list maintaining unit 1022 is configured to maintain a list of candidate F-STAs. List maintaining unit 1022 sorts the list of candidate F-STAs according to a metric, such as energy savings gain, received signal strength, and the like. A selecting unit 1024 is configured to select a candidate F-STA from the list of candidate F-STAs. Selecting unit 1024 may repeatedly select candidate F-STAs until an available candidate F-STA is found or the list of candidate F-STAs is exhausted. A memory 1030 is configured to store identifying information, the list of candidate F-STAs, selected F-STA information, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while associating unit 1020, list maintaining unit 1022, and selecting unit 1024 may be software modules executing in a processor 1015, such as a microprocessor, a digital signal processor, a custom circuit, or a custom compiled logic array of a field programmable logic array. Associating unit 1020, list maintaining unit 1022, and selecting unit 1024 may be modules stored in memory 1030.

Figure 11:
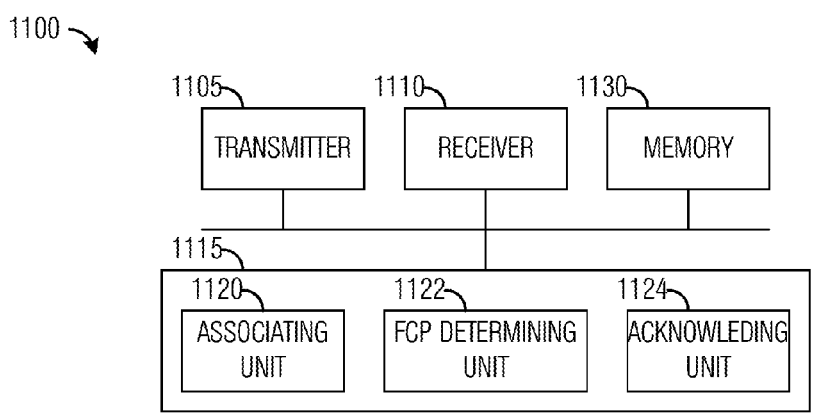
FIG. 11 illustrates an example third communications device according to example embodiments described herein.

FIG. 11 illustrates a diagram of a third communications device 1100. Communications device 1100 may be an implementation of an AP. Communications device 1100 may be used to implement various ones of the embodiments discussed herein. As shown in FIG. 11, a transmitter 1105 is configured to send messages, and the like, and a receiver 1110 is configured to receive messages, and the like. Transmitter 1105 and receiver 1110 may have a wireless interface, a wireline interface, or a combination thereof.

An associating unit 1120 is configured to perform an association procedure with a station. Associating unit 1120 may process a received association request from the station. The association request may include an indicator of station type, e.g., F-STA or NF-STA. An FCP determining unit 1122 is configured to determine a duration (as well as presence) of an FCP. As an example, FCP determining unit 1122 determines the duration of the FCP in accordance with a number of active F-STAs that will be using the FCP to transmit their identifying information. FCP determining unit 1122 also determines the number of active F-STAs, as well as the active F-STAs themselves. FCP determining unit 1122 selects the active F-STAs from stations operating as F-STAs. An acknowledging unit 1124 is configured to generate an acknowledgement (e.g., an ACK or a negative ACK) in response to a received data transmission. A memory 1130 is configured to store station type information, FCP information, active F-STA information, received data transmissions, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, transmitter 1105 and receiver 1110 may be implemented as a specific hardware block, while associating unit 1120, FCP determining unit 1122, and acknowledging unit 1124 may be software modules executing in a processor 1115, such as a microprocessor, a digital signal processor, a custom circuit, or a custom compiled logic array of a field programmable logic array. Associating unit 1120, FCP determining unit 1122, and acknowledging unit 1124 may be modules stored in memory 1130.

Although the present disclosure and its advantages have been described in detail, it should be understood that various changes, substitutions and alterations can be made herein without departing from the spirit and scope of the disclosure as defined by the appended claims.

What is claimed is:

1. A method for operating a first station, the method comprising:
    associating as a forwarding-type station with an access point, wherein associating comprises the first station transmitting an association request with a forwarding indicator;
    transmitting, by the first station, identifying information after obtaining access to a communications medium used to transmit messages;
    receiving, by the first station, a transmission intended for the access point from a second station over the communications medium, wherein the transmission is in accordance with the transmitted identifying information; and
    forwarding, by the first station, the transmission to the access point over the communications medium.

2. The method of claim 1, further comprising broadcasting selection information during a contention period after obtaining access to the communications medium used to transmit messages.

3. The method of claim 2, wherein the selection information including channel status information between the first station and the access point.

4. The method of claim 2, wherein the selection information including at least one of a multiple input and multiple output capability of the first station, a power capability of the first station, and a buffer capacity of the first station.

5. The method of claim 2, wherein the selection information including an access filter of the second station to indicate a condition of the second station that can be served by the first station.

6. The method of claim 1, further comprising after receiving the transmission, sending an acknowledgement to the second station.

7. The method of claim 1, further comprising receiving a duration for a contention period from the access point.

8. The method of claim 7, further comprising receiving an active forwarder indicator from the access point.

9. The method of claim 8, wherein the active forwarder indicator and the duration are transmitted together.

10. The method of claim 1, wherein receiving the transmission occurs after a contention period ends.

11. The method of claim 1, wherein the first station receives a plurality of transmissions intended for the access point, and wherein the method further comprises:
    aggregating a subset of the plurality of transmissions to produce an aggregated transmission; and
    transmitting the aggregated transmission to the access point.

12. A method for operating a second station, the method comprising:
- associating as a non-forwarding-type station with an access point, wherein associating comprises the second station transmitting an association request with a non-forwarding indicator;
- obtaining, by the second station, access to a communications medium used to transmit messages;
- receiving, by the second station, identifying information after obtaining access to the communications medium;
- determining, by the second station, if a first station is available for message forwarding;
- transmitting, by the second station, a message intended for the access point to the first station when the first station is available for message forwarding, wherein the message is transmitted in accordance with the received identifying information; and
- transmitting, by the second station, the message intended for the access point directly to the access point when the first station is not available for message forwarding.

13. The method of claim 12, further comprising transmitting a trigger message to the first station to initiate the first station to transmit identifying information.

14. The method of claim 12, further comprising:
- receiving identifying information from a plurality of forwarder stations including the first station; and
- generating a list of candidate forwarder stations including the first station from the identifying information.

15. The method of claim 14, further comprising selecting the first station to minimize one of an energy consumption of the second station and a transmission time of the second station.

16. The method of claim 14, further comprising selecting the first station in accordance with an access filter.

17. The method of claim 14, further comprising selecting the first station in accordance with an access filter and to minimize an energy consumption of the second station and a transmission time of the second station.

18. The method of claim 14, further comprising selecting the first station in accordance with an access filter and to maximize a throughput of the second station.

19. The method of claim 14, further comprising selecting the first station in accordance with an access filter and to maximize one of a forwarding capacity of the first station and a largest buffer capacity of the first station.

20. The method of claim 14, further comprising sorting the list of candidate forwarder stations.

21. The method of claim 20, wherein the list of candidate forwarder stations is sorted in accordance with channel quality information associated with each of the forwarder stations.

22. The method of claim 14, further comprising sorting the list of candidate forwarder station in accordance with at least one of an access filter and selection information.

23. The method of claim 14, further comprising selecting the first station from the list of forwarder stations.

24. The method of claim 12, further comprising receiving an acknowledgement for the message from the first station.

25. The method of claim 12, further comprising receiving an acknowledgement for the message from the access point.

26. The method of claim 12, wherein the message includes an indicator signifying that the message is to be relayed by the first station.

27. The method of claim 26, wherein the indicator comprises three media access control layer addresses.

28. The method of claim 26, wherein the indicator is located in a field in a packet including the message.

29. The method of claim 12, further comprising the second station receiving a forwarding request from the access point.

30. A method for operating an access point, the method comprising:
- accepting, by the access point, association from a second station and from a plurality of first stations, wherein accepting association comprises the access point requesting a subset of the plurality of first stations perform forwarding in accordance with forwarding indicators received from the first stations;
- receiving, by the access point, a message from one of the first stations over a communications medium used to transmit messages, the communications medium temporarily accessed by one of the first stations, the message originally transmitted by the second station; and
- transmitting, by the access point, an acknowledgement for the message to the second station.

31. The method of claim 30, further comprising prior to receiving the message:
- determining a forwarding station contention period in accordance with the plurality of first stations; and
- broadcasting a beacon and information about the forwarding station contention period to the subset of the plurality of first stations.

32. The method of claim 30, wherein the message is transmitted over a plurality of channels.

33. The method of claim 30, wherein associating, by the access point, with the plurality of first stations and the second station further comprises the access point receiving an association request with a forwarding or non-forwarding indicator from each station.

34. A forwarder station comprising:
- a transmitter configured to transmit an association request with a forwarding indicator, to transmit identifying information after obtaining access to a communications medium used to transmit messages, and to forward a transmission intended for an access point from a second station to the access point over the communications medium;
- a receiver operatively coupled to the transmitter, the receiver configured to receive the transmission intended for the access point from the second station over the communications medium, wherein the transmission is in accordance with the transmitted identifying information; and
- a processor operatively coupled to the transmitter and to the receiver, the processor configured to associate as a forwarding-type station with the access point.

35. The forwarder station of claim 34, wherein the transmitter is configured to send an acknowledgement to the second station.

36. The forwarder station of claim 34, wherein the receiver is configured to receive a duration for a contention period from the access point.

37. The forwarder station of claim 34, wherein the receiver is configured to receive an active forwarder indicator from the access point.

38. The forwarder station of claim 34, wherein the receiver is configured to receive a plurality of transmissions intended for the access point, and wherein the processor is further configured to aggregate a subset of the plurality of transmissions to produce an aggregated transmission, and wherein the transmitter is configured to transmit the aggregated transmission to the access point.

39. A second station comprising:
- a processor configured to obtain access to a communications medium used to transmit messages, associate as a non-forwarding-type station with an access point, and to determine if a first station is available for message forwarding;

a transmitter operatively coupled to the processor, the transmitter configured to transmit an association request with a non-forwarding indicator, and transmit a message intended for the access point to the first station when the first station is available for message forwarding, and to transmit the message intended for the access point directly to the access point when the first station is not available for message forwarding, wherein the message is transmitted in accordance with received identifying information; and a receiver operatively coupled to the processor, the receiver configured to receive the identifying information from a plurality of forwarder stations including the first station.

40. The second station of claim 39, wherein the processor is further configured to generate a list of candidate forwarder stations including the first station from the identifying information.

41. The second station of claim 40, wherein the processor is configured to sort the list of candidate forwarder stations.

42. The second station of claim 40, wherein the processor is configured to select the first station from the list of forwarder stations.

43. The second station of claim 39, wherein the receiver is further configured to receive an acknowledgement for the message from the first station.

44. The second station of claim 39, wherein the receiver is further configured to receive an acknowledgement for the message from the access point.

* * * * *